June 12, 1934.  N. HEMMAN  1,962,562
DISPENSING RECEPTACLE
Filed April 20, 1933    2 Sheets-Sheet 2

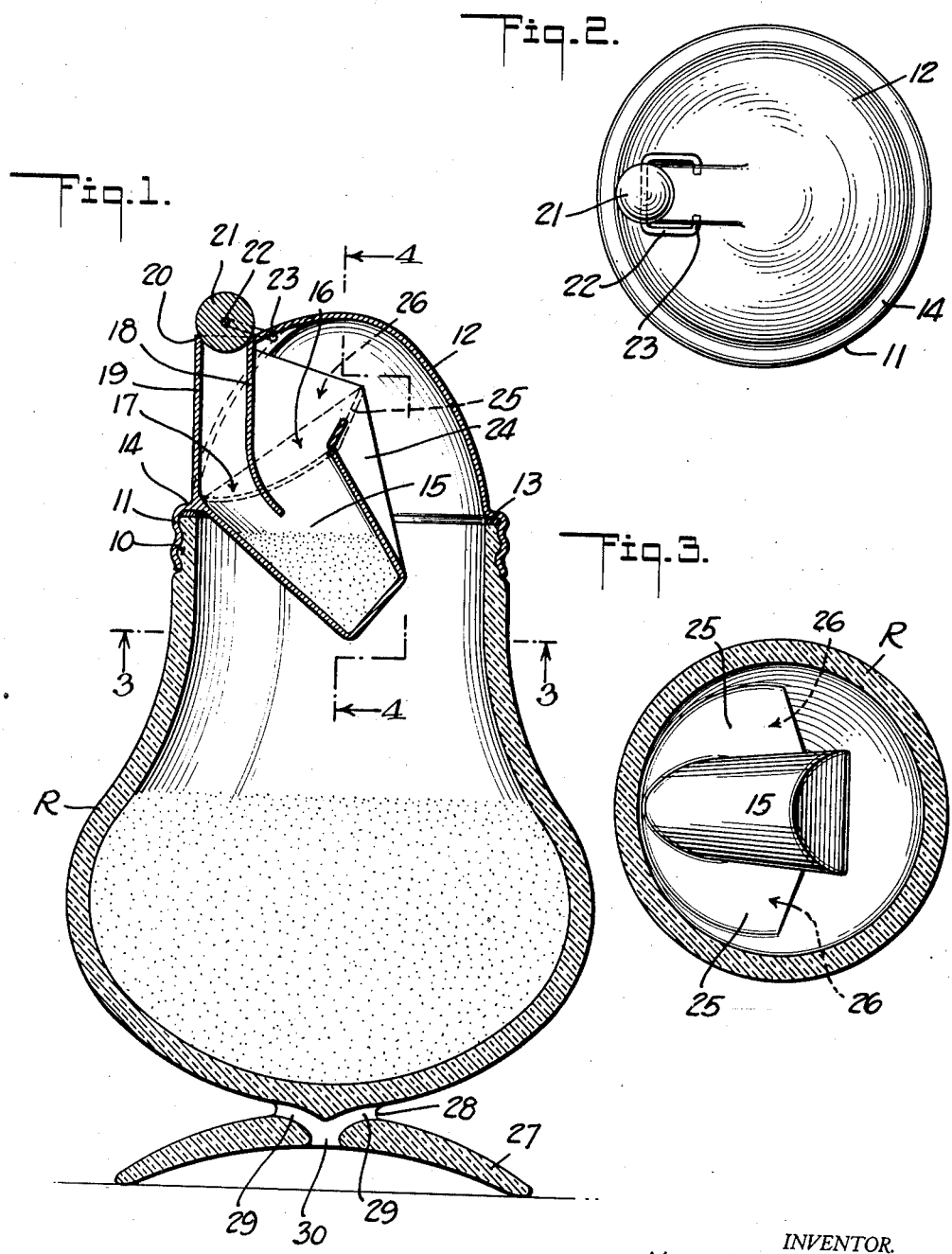

INVENTOR.
NELSON HEMMAN
BY
Munn, Anderson, Stanley, Foster & Liddy
ATTORNEYS.

Patented June 12, 1934

1,962,562

UNITED STATES PATENT OFFICE 1,962,562

DISPENSING RECEPTACLE

Nelson Hemman, San Diego, Calif.

Application April 20, 1933, Serial No. 667,094

5 Claims. (Cl. 221—98)

This invention relates to and has for a purpose the provision of a receptacle from which an accurately measured quantity of fluid material, such as sugar, for example, can be dispensed each time the receptacle is manipulated from a normal position to a pouring position, and until the receptacle is exhausted of its contents.

It is a further purpose of the invention to provide a dispensing receptacle in which the measuring means will not readily become clogged by lumps in the material being dispensed, and is structurally characterized in a manner to insure accuracy in measurement, even though the receptacle be not properly positioned to dispense a full charge with the outlet of the receptacle downmost, but only tilted to a horizontal position or inverted with the outlet facing towards one side or the other.

It is another purpose of the invention to provide a sanitary receptacle constructed in a manner to shed liquids or solids with minimum resistance so that following washing of the receptacle in hot water, the receptacle will become dried and polished without the use of a cloth, all while providing an airtight closure for the outlet of the receptacle, and insuring a circulation of air at the base of the receptacle to promote a uniform temperature throughout the receptacle, so that its contents will not cake.

Only one form of the invention will be described in the following specification, and the novel features then pointed out in claims.

In the accompanying drawings

Figure 1 is a vertical sectional view of the dispensing receptacle in upright or normal position;

Figure 2 is a plan view of the dispensing receptacle;

Figure 3 is a transverse sectional view taken on the line 3—3 of Figure 1;

Similar reference characters designate similar parts in each of the several views.

Figure 4:
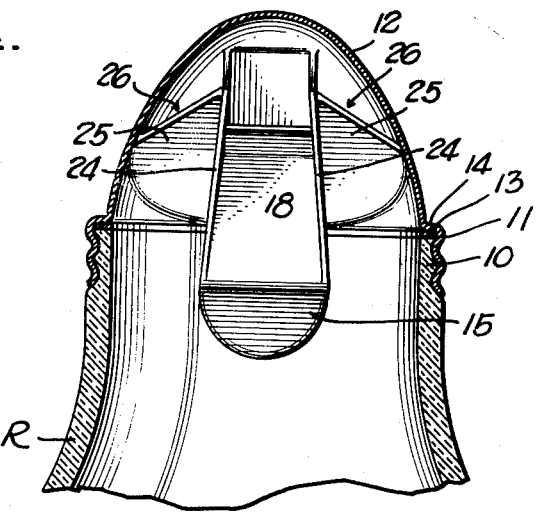
Figure 4 is a fragmentary longitudinal sectional view taken on the line 4—4 of Figure 1.

Referring specifically to the drawings, this invention comprises a receptacle R, preferably constructed of glass, with its upper open end externally threaded at 10 to threadedly receive an enlarged and internally threaded flange 11 projecting from a relatively deep and conoidal shaped cover 12, a gasket 13 being interposed between the lip of the receptacle and an annular shoulder 14 on the cover, to produce an air-tight seal between the receptacle and cover when the latter is screwed tightly on the receptacle.

In the present instance, the measuring and dispensing means embodying this invention forms a part of the cover 12, and comprises a measuring chamber 15 having an inlet 16 opening upwardly when the receptacle occupies its normal or upright position shown in Figure 1, and communicating with the interior of the cover. The chamber 15 is provided with an outlet 17, also opening upwardly when the receptacle is upright, and separated from the inlet 16 by a partition 18 which forms one wall of a spout 19, the inner end of which opens to the outlet 17, and the outer end of which terminates in an annular seat 20, normally engaged by a spherical body 21 of polished metal rotatably mounted on a bail 22 pivoted at 23 on the cover. The body 21 is urged by gravity against the seat 20 when the receptacle is upright, and coacts with the seat to form an airtight closure for the outlet of the chamber so as to prevent moisture from affecting the contents of the receptacle by causing such contents to become caked or lumpy.

Figure 5:
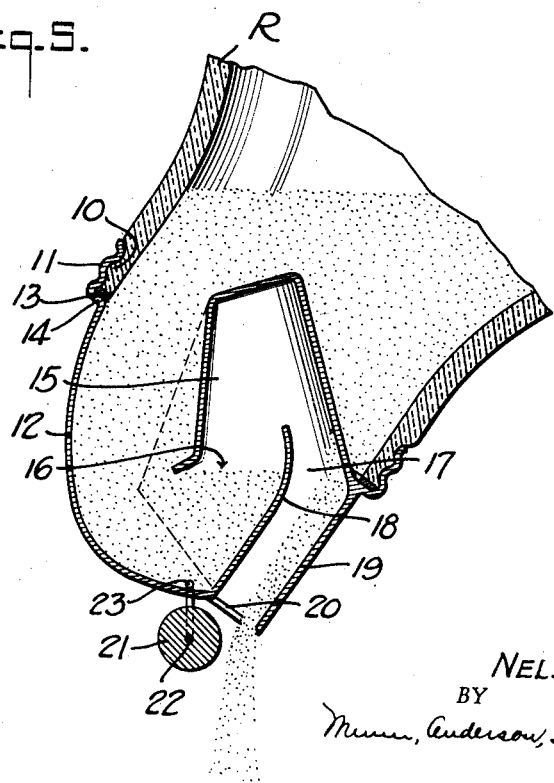
Figure 5 is a fragmentary view similar to Figure 1, and illustrating the dispensing receptacle in pouring position.

Projecting laterally from the side walls 24—24 of the measuring chamber 15 are walls 25—25 (Figures 3 and 4) which coact with the cover 12 to define auxiliary chambers 26—26 in the form of pockets, the inlets of which are disposed to receive portions of the contents of the receptacle when inverted to the pouring position shown in Figure 5, and to confine such portions when the receptacle is restored to upright position.

The operation of the dispensing receptacle is as follows:

Let it be assumed that the receptacle has been supplied with a quantity of granulated sugar for dispensing from the receptacle. The receptacle is then inverted to the pouring position shown in Figure 5, this operation causing sugar to flow to the level of the inlet 16 of the measuring chamber directly below the inlet as shown in Figure 5, and to cause sugar to flow into the auxiliary chambers 26—26. Upon restoring the receptacle to its upright position, a quantity of sugar will gravitate into the chamber 15 and will be confined therein at the bottom thereof as shown in Figure 1, and the quantities of sugar which have flowed into the auxiliary chambers will remain therein.

Now upon again inverting the receptacle to the pouring position shown in Figure 5, the quantity of sugar which has been deposited in the chamber 15 will flow therefrom through the outlet 17 thereof into the spout 19 so as to discharge from the spout. Each time the receptacle is thus inverted and restored to upright position, a practically uniform quantity of sugar will be dispensed until the receptacle is emptied of its contents.

The auxiliary chambers 26—26 function to insure accuracy of measurement of a charge in the chamber 15 in the event that in a dispensing operation the receptacle is tilted to only a horizontal position and part of a full charge in the measuring chamber 15 shaken out, or should the receptacle be inverted with the spout 19 facing to one side or the other rather than downmost so as to only dispense a part of a full charge from the chamber 15.

Under the first condition of improper manipulation of the receptacle, sugar from the auxiliary chamber will flow therefrom into the chamber 15 as the receptacle is tilted to a horizontal position and restored to upright position, whereby to replenish the chamber 15 with a sufficient quantity of sugar to replace that portion of a full charge in the chamber 15 which has been shaken out, so that a full charge will be present in the chamber 15 for the next dispensing operation.

Under the second condition of improper manipulation of the receptacle, sugar from one auxiliary chamber or the other will flow therefrom into the chamber 15 as the receptacle is inverted, with the spout 19 facing to one side or the other, and restored to upright position, whereby to likewise replenish the chamber 15 with a sufficient amount of sugar to replace that portion of a full charge in the chamber 15 which is dispensed therefrom, thus insuring that should the receptacle be improperly manipulated to dispense only a portion of a full charge from the chamber 15, that the latter will have a sufficient amount of sugar added to the remainder of its charge, from the auxiliary chambers, to provide a full charge in the chamber 15 for the succeeding dispensing operation.

It is to be noted that the internal wall of the receptacle R is formed entirely by smooth and curved surfaces so as to preclude the sticking of the contents of the receptacle to the wall, and that the bottom of the receptacle is provided with a base 27 of concavo-convex contour in cross section. The base is joined to the bottom bowl portion of the receptacle by a neck 28 through which extend vent passages 29 communicating with a vent port 30 disposed axially in the base, all as clearly shown in Figure 1. This construction provides for a circulation of air under the base from any surface on which the base is rested, with the object of preventing moisture from being conducted to the contents of the receptacle, with the resultant caking of the contents.

I claim:

1. A receptacle; a chamber in the receptacle having an inlet disposed to receive fluid material from a supply in the receptacle when the latter is inverted, and so that a charge of the material will gravitate into the chamber when the receptacle is restored to upright position, the chamber having an outlet from which a charge of material in the chamber is dispensed when the receptacle is inverted, and auxiliary chambers correlated with the first said chamber to receive material from the receptacle when inverted, and to discharge a sufficient quantity of the material into the first chamber to replace a portion of a full charge therein, dispensed by improper manipulation of the receptacle, whereby to insure that the first chamber will contain a full charge for a subsequent dispensing operation.

2. A receptacle adapted to contain a supply of fluid material and having an outlet for the discharge of the material, means in the receptacle communicating with the outlet, in which a charge of the material from a supply in the receptacle is caused to be confined and then discharged from the outlet each time the receptacle is moved to a predetermined pouring position from a normal position, and means in the receptacle correlated with the first means to receive material from the supply in the receptacle when the latter is inverted, and to discharge sufficient material into the first means to replace a portion of a full charge in the latter, dispensed therefrom by improper manipulation of the receptacle.

3. A receptacle adapted to contain fluid material; a cover for the receptacle having a spout; a chamber in the cover having an inlet disposed to receive material from the receptacle when inverted, and so that a charge of the material will gravitate into the chamber when the receptacle is restored to upright position; the chamber having an outlet communicating with the spout and from which a charge of material in the chamber is discharged and dispensed from the spout when the receptacle is inverted; and walls projecting from opposite sides of the chamber to the cover defining auxiliary chambers adapted to receive material from the receptacle when inverted, and to discharge such material into the first chamber to replace a portion of a full charge therein, dispensed by improper manipulation of the receptacle.

4. A receptacle adapted to contain a fluid material; the receptacle having a base the under surface of which is recessed and is provided with an opening for venting the bottom surface of the base to atmosphere when the base is resting on a support.

5. A receptacle adapted to contain a fluid material; the receptacle having a base and a neck joining the base to the lower portion of the receptacle, the under surface of the base being recessed, and the base and neck having a vent for the circulation of air from beneath the base when resting on a support.

NELSON HEMMAN.